(12) United States Patent
Wolframm

(10) Patent No.: US 6,577,264 B1
(45) Date of Patent: Jun. 10, 2003

(54) HELICOPTER-BORNE RADAR SYSTEM

(75) Inventor: Aribert Wolframm, Landsberg (DE)

(73) Assignee: EADS Deutschland GmbH, Ottobrunn (DE)

( * ) Notice: Subject to any disclaimer, the term of this patent is extended or adjusted under 35 U.S.C. 154(b) by 0 days.

(21) Appl. No.: 10/088,896

(22) PCT Filed: Sep. 2, 2000

(86) PCT No.: PCT/DE00/02998

§ 371 (c)(1),
(2), (4) Date: Mar. 25, 2002

(87) PCT Pub. No.: WO01/23907

PCT Pub. Date: Apr. 5, 2001

(30) Foreign Application Priority Data

Sep. 24, 1999 (DE) .......................................... 199 45 791

(51) Int. Cl.[7] .............................................. G01S 13/90
(52) U.S. Cl. ........................................................ 342/25
(58) Field of Search ........................... 342/25, 191, 202

(56) References Cited

U.S. PATENT DOCUMENTS

| | | | | |
|---|---|---|---|---|
| 4,638,315 A | * | 1/1987 | Raven .......................... | 342/25 |
| 5,017,922 A | * | 5/1991 | Klausing et al. .............. | 342/25 |
| 5,392,047 A | * | 2/1995 | Klausing ...................... | 342/25 |
| 5,451,957 A | * | 9/1995 | Klausing ...................... | 342/25 |
| 5,659,318 A | | 8/1997 | Madsen et al. ............... | 342/25 |
| 5,777,573 A | * | 7/1998 | Klausing et al. .............. | 342/25 |

FOREIGN PATENT DOCUMENTS

DE 39 22 086 C1 7/1989
DE 43 28 573 A1 8/1993

OTHER PUBLICATIONS

International Search Report and translation of pertinent portions.

* cited by examiner

Primary Examiner—Ian J. Lobo
(74) Attorney, Agent, or Firm—Crowell & Moring LLP

(57) ABSTRACT

A helicopter-borne radar system has a synthetic aperture with rotating antennae (ROSAR). The antennae for transmitting and receiving radar pulses are arranged at the end of each arm rotating with the rotor, and are connected with the radar system which has at least one transmitting module, one electronic module with a central control device and an image processor as well as a display. In order to align the imaging on the display of the radar system with an inertial axis of the helicopter, and to limit the influence of a change of the rotational rotor on the imaging, a signal generator arranged at the rotor of the helicopter generates signals indicative of rotating positions of the rotor. The latter signals are transmitted to an electronic module of the radar system, which marks the flank of an individual signal from the signal sequence for a rotation of the rotor. This flank of a signal is defined as a "basic position" and is counted. The invention permits azimuthally phase-accurate synchronization between the viewing angle of a helicopter-borne radar system and an inertial axis of the helicopter, as well as a defined alignment of the image on the video screen with respect to an inertial axis of the helicopter (and thus with respect to the flight direction of the helicopter). The viewing direction of the radar system (ROSAR) can be adjusted by means of an electric regulator wheel, so that the pilot can set a desired defined viewing direction of the radar image on the video screen.

8 Claims, 2 Drawing Sheets

HELICOPTER-BORNE RADAR SYSTEM

This application claims the priority of PCT/DE00/02998 filed Sep. 02, 2000 (02.09.00) and German patent document 199 45 791.3, filed Sep. 24, 1999 (24.09.999), the disclosure of which is expressly incorporated by reference herein.

BACKGROUND AND SUMMARY OF THE INVENTION

The invention relates to a helicopter-borne synthetic aperture radar system having rotating antennae for transmitting and receiving radar pulses (ROSAR). The antennae are arranged at the ends of arms that rotate with the rotor, and are connected with the radar system, which has at least one transmitting module, one electronic module with a central control device, an image processor and a display.

A radar system having a synthetic aperture (abbreviated SAR: Synthetic Aperture Radar) based on rotating antennae, abbreviated ROSAR (ROSAR:Rotor-SAR), is suitable for a helicopter as the supporting platform. The basic characteristics with respect to ROSAR were described in German Patent Document DE 39 22 086 C1. The rotating movement of the rotor blades or the rotating movement of a turnstile arranged above the rotor head and connected with the rotor mast is utilized for producing the synthetic aperture. As a result, the ROSAR principle differs basically from a radar (SAR) with a linear antenna movement, as customary in the case of airplanes.

A ROSAR system covers the entire angular range of a full circle of 360 degrees. In this case, transmitting and receiving antennae of a rotating arm are always used for transmitting and receiving, the transmitting pulses for scanning being radiated during the rotating movement of the arm at a defined pulse repetition frequency, by way of the transmitting antenna, and the echo signals received by way of the receiving antenna. This also relates to the antennae of the other rotating arms. The rotating arm may be a rotor blade which, on the rotor head, is connected with the rotating rotor mast of a helicopter. On the other hand, it may also be constructed as an arm of a turnstile (also called antenna cross) which is positioned above the rotor mast and is connected with the latter. The turnstile rotates at the rotational speed of the rotor mast. The radar system is a radar which ensures a coherent signal processing and is housed onboard the helicopter.

ROSAR is used both for warning of obstacles and for imaging the ground. For this purpose, the antennae are arranged to "look" into the radial direction and are oriented above and below the horizon. The viewing direction of the radar system is determined by the viewing direction of the antennae which depends in turn on the rotating position of the rotor mast. (The viewing direction is that direction on a full circle in which transmitting pulses and echo signals are represented on the display in an image.)

German Patent Document DE 43 28 573 C2 discloses a further development of the ROSAR to an all-weather viewing system for helicopters. The complex image produced by means of the all-weather viewing system is displayed on a pertaining cockpit display.

In the closest state of the art (its further development for the all-weather viewing system), no connection is described between the viewing direction of the antenna of the radar system and the inertial axes of a helicopter as the supporting platform.

The circular-arc-shaped synthetic aperture is defined as the path of the phase center of the antenna, which path is covered during the sweep over the azimuth opening angle for a certain target on the ground. Since the antenna phase center is not designed for a linear movement in the flight direction, but rather for a rotational movement, the viewing direction of the radar is arbitrary with respect to the inertial axes of the helicopter. Inertial axes may essentially be the spatial axes of coordinates (X-axis, Y-axis, Z-axis). The viewing direction of the radar is therefore situated at an undefined position of a full circle.

Since the rotational speed of the rotor mast may also vary, it is also disadvantageous that the number of the radar pulses per rotation does not correspond precisely to the actual rotational speed of the rotor mast, which also adversely affects the imaging.

It is an object of the invention to provide a ROSAR system in which imaging on the display of the radar system can be aligned with one of the inertial axes of the helicopter.

Another object of the invention is to provide such a system in which the adverse influence on the imaging of a change in rotational rotor speed is further limited.

These and other objects and advantages are achieved by the ROSAR according to the invention, in which a signal generator arranged at the rotor of the helicopter generates signals indicative of rotating positions of the rotor. The latter signals are transmitted to an electronic module of the radar system, which marks the flank of an individual signal from the signal sequence for a rotation of the rotor. This flank of a signal is defined as a "basic position" and is counted. (The basic position is a point on the circular rotation of the rotor which marks the start of a rotor rotation; and the location of the basic position on the full rotational circle also simultaneously defines the position of an inertial axis of the helicopter. The location of the basic position on a full circle can be changed.) Furthermore, the central control unit uses the signal with respect to the basic position to generate a control signal that is used in the transmitter module to synchronize the pulse rate of that module with the rate of rotation of the rotor.

The signal generator that is used for this purpose comprises one or more transmitters arranged at the rotor, and one or more opposite receivers are arranged on the fuselage of the helicopter. (However, the transmitters and the receivers can also be positioned in a reverse sequence.) The transmitters may be magnets and the receivers may be corresponding Hall elements. Alternatively, the transmitters and receivers may be opto-electronic or microwave components.

The invention permits azimuthally phase-accurate synchronization between the viewing angle of a helicopter-borne radar system and an inertial axis of the helicopter, as well as a defined alignment of the image on the video screen with respect to an inertial axis of the helicopter (and thus with respect to the flight direction of the helicopter.) The relationship between the image content and the flight direction is provided solely by means of such synchronization. The viewing direction of the radar system (ROSAR) can be adjusted by means of an electric regulator wheel, so that the pilot can set a desired defined viewing direction of the radar image on the video screen.

The provisions of a signal generator at the rotor can also improve the imaging, in that the radar pulses are synchronized with respect to the rotational speed of the rotor.

Other objects, advantages and novel features of the present invention will become apparent from the following detailed description of the invention when considered in conjunction with the accompanying drawings.

DETAILED DESCRIPTION OF THE DRAWINGS

Figure 1:
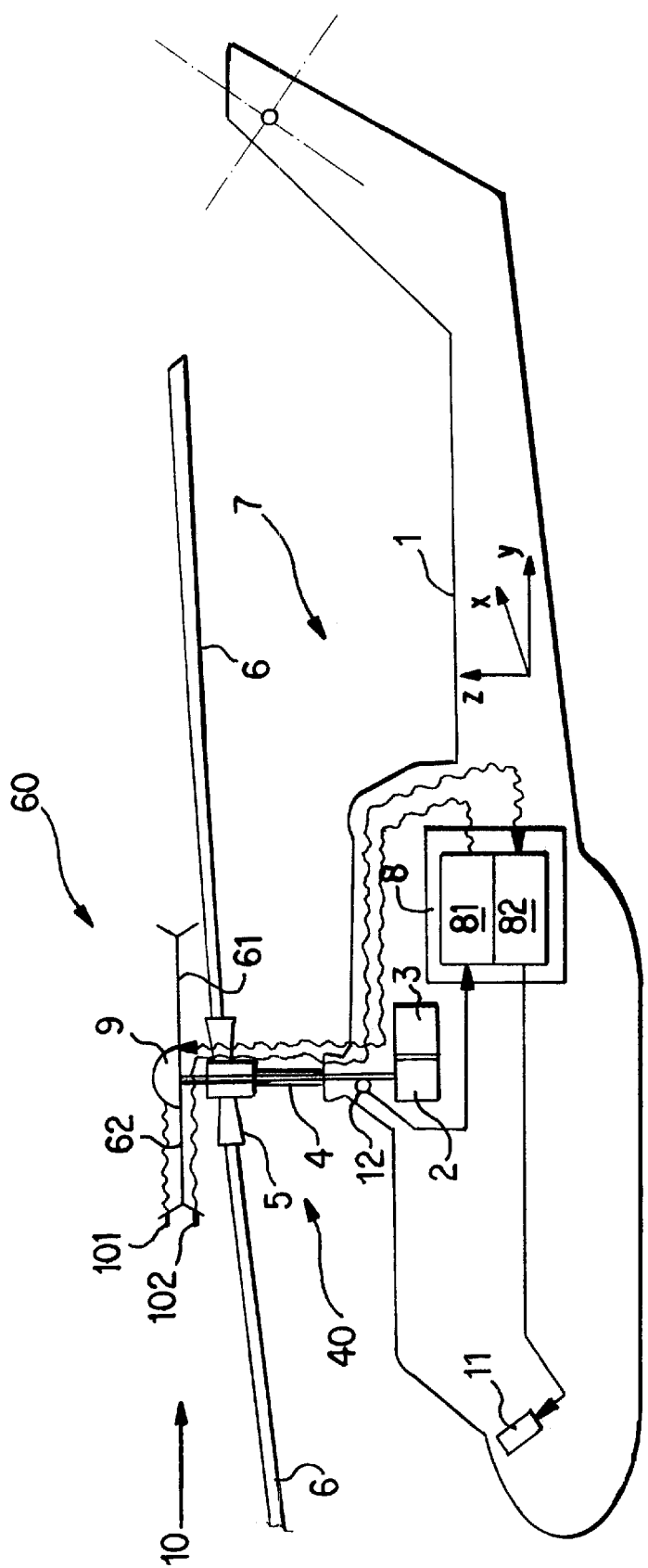
FIG. 1 illustrates the principle of a helicopter-borne radar system.

FIG. 1 shows an outline of a helicopter 1 as a supporting platform for a radar system 7 with a synthetic aperture with rotating antennas (ROSAR). (For the purpose of explaining the device according to the invention and its method of operation, only basic modules of the radar system 7 are illustrated.) A drive 3 (such as an engine) supplies the driving energy by way of gears 2 with a clutch to the rotor mast 4. Rotor blades 6 are fastened to the rotor head 5 of the rotor mast 4. A turnstile 60 is also fastened at the rotor head 5 above the rotor blades 6. (For simplicity, the drive to the tail rotor is not shown.) As a rule, the turnstile 60 has four or more arms arranged in a cross-shape. In the figure, arms 61 and 62 are illustrated, the other two arms (not shown) pointing into the image plane or out of the image plane. The following information relating to the arm 62 applies to all arms of the turnstile.

An antenna module 10 is arranged on the radially outer end of an arm 62. The antenna module 10 contains transmitting antennae 101 and receiving antennae 102 for radar signals and reflected signals (echo signals) respectively. The transmitting antennae 101 are connected by way of an electrical connection with a transmitting module 9, arranged at the center of the turnstile 60. (Alternatively, the central transmitting module 9 may also be divided into small transmitting modules, and integrated into the antennas as so-called active antennae). The transmitting module 9 is controlled by a central control unit 81 of the electronic module 8 for the transmitting of radar pulses. The receiving antennae 102, on the other hand, are connected at least with an image processor 82 of the electronic module 8, that controls a display 11 in the cockpit of the helicopter, providing image information to the pilot. The electronic module 8 comprises the known electronic modules for a ROSAR radar system 7, and includes at least a central control unit 81 and an image processor 82 which can reciprocally be connected with one another. The central control unit 81 has a connection to the transmitting module 9.

The connections from and to the electronic module 8 illustrated in FIG. 1 are electric lines for the data exchange and/or for control signals.

A signal generator 12, which is arranged on the rotor mast 4, and is connected with the central control unit 81, senses the rotational rotor speed and the "alignment condition" of the antenna cross or of the rotor axis. Because the radar system 7 transmits radar pulses with a period length of $5*10^{-5}$ seconds, extremely high precision demands (approximately 20 KHz) are made on the signal generator 12. (For scanning of terrain, this period length is almost constant; but it may have a different value in the case of other types of helicopters.)

The electronic module 8 converts received echo signals for the display to an image consisting of a plurality of picture elements. However, the pilot must be able to recognize which viewing direction the radar system displays on the display. For this purpose, a basic position is defined for a rotation of the rotor mast, corresponding to a signal flank generated selected from a signal sequence generated by the signal generator during a rotor rotation. The defining of this basic position on an azimuthal full circle also simultaneously determines an inertial axis of the helicopter. Advantageously, the basic position, and thus the inertial axis (X-axis, Y-axis, Z-axis) to be selected, should essentially be situated in the flight direction (Y-direction).

Rotations of the rotor 40 are sensed by the signal generator 12. The term "rotor 40", it should be noted, comprises the rotor mast 4, the rotor head 5, the rotor blades 6 and the turnstile 60, and it is demonstrated that the above-mentioned components can be used as a measuring site for the sensing of the rotational rotor speed. Thus, as an alternative, the signal generator 12 can also be installed there. On the other hand, this also demonstrates the difficulty of coordinating the rotations of the rotor 40 with the radar signals (pulses) generated in the transmitter module 9. The radar pulses have a very short period length of approximately $5*10^{-5}$ seconds and are continuously transmitted (depending on the type of helicopter) at approximately 3,016 radar pulses per rotation of a transmitting antenna 101. Additional transmitting antennas are also distributed on the turnstile, each antenna rotating at the rotational rotor sped.

A starting position must simultaneously be defined in the pulse sequence of the transmitter module 9, corresponding to the basic position during a rotation of the rotor 40. For this purpose, a control signal formed with each occurrence of the basic position causes the marking of an applicable feature of the pulse train (for example, a pulse flank) as the starting position in the pulse sequence. This starting position in the pulse sequence is repeated with each basic position of the rotor rotation. This simultaneity of the two events, that is, a synchronization, must be controlled by the central control unit 81 with respect to the transmitter module 9.

For the latter purpose, the central control unit 81 has at least one counter module which determines the exact angle-of-rotation positions of the rotor 40 (preferably of the rotor mast 4), and supplies a control signal precisely at the point in time at which the basic position of a rotation has been reached. The basic position counted in a counter module of the central control device 81 generates the control signal. This control signal of the central control unit 81 causes, with respect to the transmitter module 9, the counting start in a phase-accurate manner; that is, the definition of a starting position in the pulse sequence of the radar pulses.

Thus, while the rotational rotor speed is constant, it is not only known how many radar pulses per rotation (pulse rate) are transmitted in the full circle, but each pulse sequence of the transmitter 9 for a rotation of the rotor 40 has the same starting position.

The starting position is simultaneously aligned with the selected inertial axis of the helicopter.

The starting position of radar pulses for a subsequent rotation of the antenna module 10 in the full circle corresponds to a zero-degree position which is in correspondence (synchronization) with an inertial axis, situated in the azimuth. In the present example, this advantageously is the Y-axis. The zero-degree position therefore always defines the start for each rotation of the radar viewing angle (antenna module 10) on a full circle, permitting a continuous reference of subsequent radar pulses to a zero-degree position.

The receiving antennae 102 receive reflected signals (echo signals) and the electronic module 8 generates the corresponding image on the display. As a rule, the image is constructed in a line-type manner, and while the rotational rotor speed is constant, the generated image information can be precisely assigned with respect to the zero-degree position and can be assembled to form an image.

With reference to the inertial axis (for example, the Y-axis), the pilot can immediately recognize the viewing direction of the radar system 7. The possibility may also be provided of switching the electronic module 8 to another inertial axis (X-axis) in the azimuth, so that a changed viewing direction is recognized in the image.

The invention also makes it possible to integrate the imaging by means of the electronic module 8 into a variable rotational speed of the rotor, which occurs at the start during the rotor run-up or in the flying operation in order to achieve a noise reduction, or during flying maneuvers or under variable wind conditions. Since, at a changed rotational speed, the rate of rotation of the rotor 40 is no longer synchronous with the pulse rate of the transmitter 9, an interference occurs with the buildup of the image. For example, in the event of a corresponding increased or decreased rotational rotor speed in comparison with the nominal rotational speed, the radar pulse sequence becomes smaller or larger than required for the line buildup in the image. This can be corrected, for example, by replacing lacking image information of the actual pulse rate with zero values, or by suppressing excessive image information. Another possibility would be to adapt the pulse rate of the oscillator of the transmitter 9 to the rate of rotation of the rotor mast 4.

An appropriate signal generator 12 is important for the functioning of the invention. This signal generator consists of one or more transmitters and of one or several receivers. In principle, the transmitters, for example, are mounted on the rotating part (turnstile 60) of the ROSAR, and the receivers on the fixed part of the helicopter fuselage. The same effect is achieved, however, when the arrangement is interchanged between the transmitter and the receiver. The construction of the transmitter and the receiver may be based on various physical principles; for example, they may communicate on the basis of light waves, of microwaves or of Hall generators.

Figure 2:
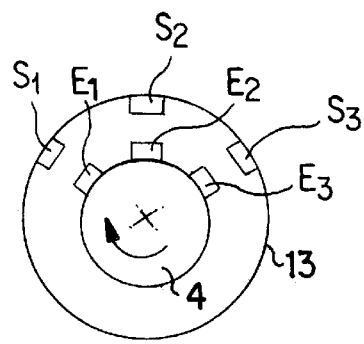
FIG. 2 shows an arrangement of a signal generator on the rotor, particularly in the region of the rotor mast and of the fuselage cell.

FIG. 2 is a schematic view of the arrangement of three receivers E1, E2, E3 on the rotor mast 4 and the corresponding positioning of three transmitters S1, S2, S3 on the helicopter cell 13. As a schematic top view, the figure shows that ideally the transmitter and the receiver are arranged opposite one another. For example, the transmitter may be a light-emitting diode which permanently emits a light which is focussed on the sensor surface of the photoelectrically operating receiver.

Figure 3:
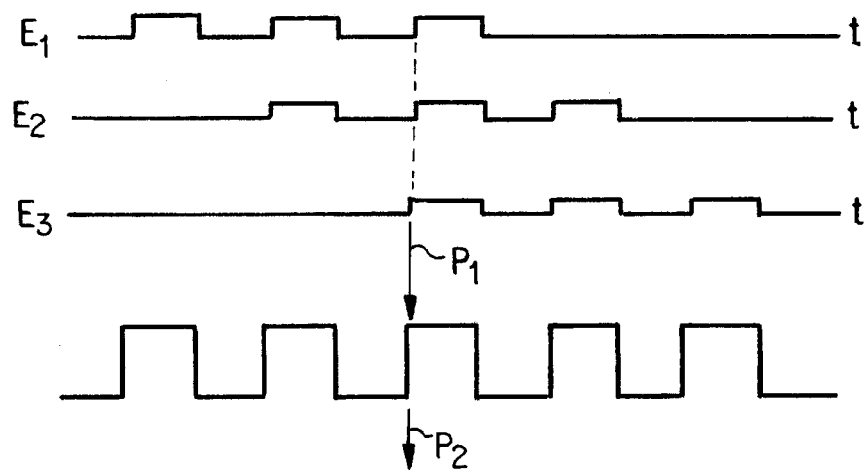
FIG. 3 is a pulse diagram of the receivers of a signal generator for determining a basic position and deriving a starting position in the pulse sequence of an oscillator of the transmitter module.

During a rotation of the rotor mast 4 in the positive direction (see arrow), precisely one rotation is achieved when the receiver E1 has received three pulses, the receiver E2 has received two pulses, and the receiver E3 has received one pulse. When precisely the pulse flanks of all three receivers E1, E2, E3 occur according to the pulse diagram, a basic position P1 for a rotation of the rotor mast 4 has been reached (FIG. 3).

This counted basic position P1 (in a counter module of the central control unit 81) corresponds to a control signal in the central control unit 81. This control signal is transmitted to the transmitter module 9. From the pulse sequence of an oscillator of that module, isochronously with the occurrence of the control signal, a relevant synchronous radar pulse is selected as the starting position P2. This counting takes place in the transmitter 9. As a result, the rotor rotation and the pulse sequence of the oscillator are synchronized.

The asymmetrical arrangement of the transmitter-receiver modules with respect to one another is intended for avoiding ambiguities in the pulse diagram.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A synthetic aperture radar system, comprising:
   rotating antennae for transmitting and receiving radar pulses, arranged at ends of rotating arms of a rotor;
   at least one transmitter module;
   one electronic module with a central control device;
   an image processor with a display; and
   a signal generator arranged on the rotor for generating signals with respect to the rotating positions of the rotor; wherein,
   signals from the signal generator are transmitted to the electronic module of the radar system and are processed there, such that a viewing angle of the antennas can be synchronized with an inertial axis and the generated signals can be supplied to the central control device; and
   the central control device forms control signals which synchronize a pulse rate of the transmitter module with a rotating rate of the rotor, whereby a number of the radar pulses per rotation corresponds precisely to actual rotational speed of the rotor.

2. The system according to claim 1, wherein:
   one of the generated signals forms a basic position P1 which marks the beginning of a rotor rotation; and
   the location of the basic position P1 on a full circle defines the position of the inertial axis.

3. A system according to claim 2, wherein the location of the basic position P1 on the full circle can be changed.

4. The system according to claim 1, wherein:
   at least one transmitter is arranged on the rotor; and
   at least one corresponding receiver is arranged on a fuselage.

5. The system according to claim 1, wherein:
   at least one signal generator is arranged on the fuselage; and
   at least one corresponding receiver is arranged on the rotor.

6. The system according to claim 4, wherein:
   the transmitters comprise magnets; and
   the receivers comprise Hall elements.

7. The system according to claim 4, wherein:
   the transmitters comprise opto-electronically transmitting modules; and
   the receivers comprise opto-electronically operating receiving modules.

8. The system according to claim 4, wherein:
   the transmitters comprise microwave transmitters; and
   the receivers comprise microwave receivers.

* * * * *